United States Patent [19]

Glaser et al.

[11] 3,928,632

[45] Dec. 23, 1975

[54] EGG SUBSTITUTE PRODUCT

[75] Inventors: Ernest Glaser, Moraga; Philip F. Ingerson, Merced, both of Calif.

[73] Assignee: Avoset Food Corporation, Oakland, Calif.

[22] Filed: July 31, 1974

[21] Appl. No.: 493,450

[52] U.S. Cl. ..................... 426/72; 426/73; 426/614
[51] Int. Cl.² ......................................... A23L 1/30
[58] Field of Search ........ 426/196, 72, 73, 211, 212

[56] References Cited
UNITED STATES PATENTS

| | | |
|---|---|---|
| 3,475,180 | 10/1969 | Jones ................................. 426/185 |
| 3,563,765 | 2/1971 | Melnick .............................. 426/211 |
| 3,594,183 | 7/1971 | Melnick et al. ................. 426/211 X |
| 3,806,608 | 4/1974 | Perret .............................. 426/211 |

*Primary Examiner*—Raymond N. Jones
*Attorney, Agent, or Firm*—Joseph A. Marlino; Richard D. Foggio; William H. Edgerton

[57] ABSTRACT

A liquid egg substitute product which is virtually cholesterol free and comprises in combination egg white, polyunsaturated liquid vegetable fats, and a fatty acid lactylate alkali metal salt.

5 Claims, No Drawings

EGG SUBSTITUTE PRODUCT

The present invention relates to an egg substitute product in which the yolks are separated from the whites of fresh eggs and substitute ingredients are added to replace the original properties of the missing yolk. The elimination of the egg yolk results in a product that is virtually cholesterol free and still provides all the nourishment of fresh eggs.

More specifically this invention relates to a stable substitute egg product containing liquid vegetable fats which are high in polyunsaturated fatty acids, egg white, and a fatty acid lactylate alkali metal salt.

It is a well accepted fact in medicine that elevated serum cholesterol levels are associated with atherosclerosis and contribute to coronary heart disease. In order to keep the cholesterol level down physicians recommend the elimination of high cholesterol foods in the diet. One of the highest sources of cholesterol in our daily diet is the yolk of an egg. The egg yolk is known to contain animal fat which contains a high percentage of saturated fatty acids. The cholesterol esters found in atherosclerotic plaque are largely from saturated fatty acids. Therefore, most physicians and the American Heart Association suggest a drastic reduction, if not a complete elimination of eggs for individuals on restricted diets. However, eggs have become such a dominant part of our eating habit that many people find it difficult to completely eliminate them from the diet.

The egg substitute product of this invention replaces the animal fat with liquid vegetable fats which are highly polyunsaturated. The product can be employed in any recipe calling for whole eggs and helps individuals on restricted diets to control their cholesterol level while permitting them to enjoy their favorite egg dishes.

Egg substitute products are commercially available. However, one of the major disadvantages of using the currently available egg substitute products is that they display poor stability. One of the reasons for this is that egg white is very difficult to combine with an oil to produce a stable emulsion. The present egg substitute products are sold as frozen products which must be thawed before use. The thawing procedure is not only time consuming but since the egg substitute products are in sensitive emulsion form, there is definite product separation upon thawing.

A further disadvantage of these commercially available egg substitute products is that once the frozen product is thawed, the shelf life of the product is only good for up to five days under refrigeration.

It is therefore the object of this invention to provide a stable liquid egg substitute product essentially free of cholesterol which has a relatively long shelf life and will maintain all the properties, in particular the taste and texture of natural eggs.

The egg substitute compositions of this invention require no freezing and are sold as liquid products which are ready to use as soon as the package is open.

Another advantage of the novel egg substitute compositions of this invention is that they have a much more prolonged shelf life than the currently available commercial frozen products once they have been thawed. Where the label warnings on the commercial egg substitutes disclose stability is good for only five days under refrigeration, the novel compositions of this invention have a six week shelf life in liquid form.

A still further advantage of the egg substitute compositions of this invention is that since there is no freezing and thawing of the emulsion required, a homogeneous liquid product results which maintains the taste and texture of the natural egg.

The novel egg substitute compositions of this invention comprise egg white, polyunsaturated vegetable fats and a fatty acid lactylate alkali metal salt. It has been unexpectedly discovered that the combination of these ingredients results in a liquid having the advantages of stability and palatability noted above.

The fresh egg white employed in this invention will be present in an amount of from about 65 to about 90 percent of the emulsion. Preferably the egg white will be present in an amount of from about 75 to about 85 percent of the emulsion. Most advantageously the egg white will be fresh. However, reconstituted egg white powder may also be employed in the composition of this invention.

The polyunsaturated fats to be incorporated in the egg substitute products of this invention are generally derived from vegetable oils containing a high percentage of unsaturated fatty acids. These fats are nontoxic liquid vegetable fats composed of glyceryl esters of unsaturated higher fatty acids such as, for example, oleic, linoleic and linolenic acids. The vegetable oils containing these unsaturated fatty acids would be, for example, cottonseed oil, peanut oil, olive oil, corn oil, and soybean oil. Any other nontoxic vegetable oil containing a relatively high percentage of unsaturated fatty acids may be employed in this invention. The vegetable oils may be used either singly or in combination and are present in an amount of from about 0.5 to about 5.0 percent of the emulsion. Preferably the vegetable oils will be present in an amount of from about 2.0 to about 4.0 percent of the emulsion.

The higher fatty acids may be natural or synthetic fatty acids especially those of at least 12 carbons. The upper carbon limit is determined by commercial availability but usually is about 26, preferably from 1 to 6 olefinic bonds may be present.

The third ingredient, a lactylate salt, will be present in an amount of from about 0.5 to about 1.0 percent of the egg substitute emulsion. Preferably the lactylate salt will be present in an amount of from about 0.075 to about 0.50 percent of the emulsion.

The term lactylate salt is an art recognized term and may be, for example, a mono or divalent cation alkali metal salt of a fatty acid ester having the following formula:

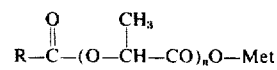

in which:

$n$ is from 2 to 4;

RCO represents an acyl radical of a fatty acid from 12 to 24 carbon atoms inclusive; and Met is a mono or divalent cationic alkali metal salt especially sodium, potassium or calcium.

The preferred lactylate salts of the emulsifier system of this invention are the sodium or calcium salts of the following: stearyl-2-lactylate, palmityl-3-lactylate, myristyl-3-lactylate, linoleyl-2-lactylate, oleyl-2-lactylate or arachidyl-2-lactylate. This ingredient is critical to the invention.

Most advantageously the lactylate salt of this invention is sodium stearyl-2-lactylate having the following formula:

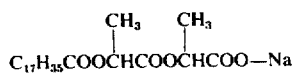

Any pharmaceutically compatible adjuvant used in liquid preparations by those skilled in the art may also be employed. For example, suspending agents or thickening agents such as tragacanth, acacia, guar gum, locust bean gum, xanthan gum, cellulosic derivatives such as, for example, sodium carboxymethylcellulose and methyl cellulose; flavoring agents such as monosodium gluconate; defoamers such as polyglyceryl oleate; and emulsifiers such as monoglycerides and diglycerides; and coloring agents such as beta carotene and other certified food colors may be used.

In a prepared embodiment vitamin and protein supplements are added to the egg substitute compositions of this invention. Exemplary of vitamins would be, for example, thiamin, riboflavin, vitamins A, D, $B_{12}$, and niacin. Exemplary of protein supplements would be, for example, caseinates, such as calcium or sodium caseinate, whey powder, skim milk powder or soy proteinate. Advantageously the protein supplement will be caseinate salts in an amount of from about 0.5 to about 5.0 percent.

Most advantageously the egg substitute compositions of this invention will consist of egg white, nontoxic liquid vegetable oils and a single emulsifier, a fatty acid lactylate alkali metal salt.

The novel egg substitute product of the present invention will be more readily understood from a consideration of the following specific example which is given for the purpose of illustration only and is not intended to limit the scope of the invention in any way.

EXAMPLE

| Ingredients | Amounts, Percent |
|---|---|
| Fresh Egg White | 84.000 |
| Soybean Oil | 3.030 |
| Sodium Caseinate | 1.500 |
| Calcium Caseinate | 1.000 |
| Sodium Stearoyl-2-lactylate | 0.150 |
| Monoglyceride | 0.050 |
| Ferrous Fumarate | 0.008 |
| Niacin | 0.002 |
| Carboxymethylcellulose | 0.290 |
| Beta Carotene | 0.060 |
| Distilled Water q.s. to | 100.000 |

The caseinates, monoglyceride, ferrous fumarate and niacin are added to the water and mixed. The soybean oil is then added with continued agitation. The mixture is then processed by heat treating and sterilizing at a temperature of approximately 250°–300°F. The mixture is homogenized at a pressure of from about 1500 to 3000 p.s.i.g. and at a temperature of between 150° to 198°F. The processed product is cooled to about 100°F.

The egg white is blended with the carboxymethylcellulose and the cooled processed product is added with agitation. The beta carotene is added and the product is aseptically packaged.

What is claimed is:

1. A liquid egg substitute product comprising from about 65 to about 90 percent egg white, from about 0.5 to about 5.0 percent of a nontoxic vegetable oil composed of glyceryl esters of unsaturated higher fatty acids, and from about 0.05 to about 1.0 percent of a fatty acid lactylate alkali metal salt, said product being free of egg yolk.

2. The egg substitute product of claim 1 in which the fatty acid lactylate salt is sodium stearoyl-2-lactylate.

3. The egg substitute product of claim 1 in which the nontoxic vegetable oil is soybean oil.

4. The egg substitute product of claim 1 in which vitamin and protein supplements are added.

5. The egg substitute product of claim 1 in which the nontoxic vegetable oil is soybean oil and the fatty acid lactylate salt is sodium stearoyl-2-lactylate.

* * * * *